(12) United States Patent
Orsley et al.

(10) Patent No.: US 8,847,915 B2
(45) Date of Patent: Sep. 30, 2014

(54) LIGHT PIPE ARRAY LENS, OPTICAL FINGER NAVIGATION DEVICE WITH THE LENS AND METHOD FOR MAKING THE DEVICE

(75) Inventors: Timothy James Orsley, San Jose, CA (US); Robert Guy Ritter, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1341 days.

(21) Appl. No.: 12/324,132

(22) Filed: Nov. 26, 2008

(65) Prior Publication Data

US 2010/0128003 A1  May 27, 2010

(51) Int. Cl.
| | | |
|---|---|---|
| G06F 3/042 | (2006.01) | |
| G02B 6/08 | (2006.01) | |
| B29D 11/00 | (2006.01) | |
| G06F 3/0354 | (2013.01) | |
| G06F 3/03 | (2006.01) | |

(52) U.S. Cl.
CPC .......... *G02B 6/08* (2013.01); *B29D 11/00663* (2013.01); *G06F 3/03547* (2013.01); *G06F 3/0317* (2013.01)

USPC ........... 345/175; 345/156; 345/157; 345/163; 345/166; 178/18.01; 250/227.2; 385/115; 385/89; 385/129; 385/120; 385/133; 362/231

(58) Field of Classification Search
USPC .......... 345/156–173; 385/119, 385; 264/1.24, 264/1, 24
See application file for complete search history.

(56) References Cited

U.S. PATENT DOCUMENTS

| | | | | |
|---|---|---|---|---|
| 4,716,287 A | * | 12/1987 | Nestler | 250/227.13 |
| 5,801,681 A | * | 9/1998 | Sayag | 345/157 |
| 6,057,540 A | * | 5/2000 | Gordon et al. | 250/221 |
| 6,552,713 B1 | * | 4/2003 | Van Brocklin et al. | 345/157 |
| 6,728,456 B1 | * | 4/2004 | Aylward et al. | 385/124 |
| 7,547,128 B2 | * | 6/2009 | Lath | 362/576 |
| 2003/0006367 A1 | * | 1/2003 | Liess et al. | 250/221 |
| 2003/0203366 A1 | * | 10/2003 | Lim et al. | 435/6 |

* cited by examiner

*Primary Examiner* — Grant Sitta (57) ABSTRACT

An optical finger navigation device and method for making the device uses a light pipe array lens, which includes an array of light pipes formed in a monolithic block of material. The light pipe array lens is configured to function similarly to a fiber bundle lens to transmit light through the lens using the light pipes in the monolithic block of material.

18 Claims, 9 Drawing Sheets

FIG. 8

LIGHT PIPE ARRAY LENS, OPTICAL FINGER NAVIGATION DEVICE WITH THE LENS AND METHOD FOR MAKING THE DEVICE

BACKGROUND OF THE INVENTION

Optical navigation systems detect relative movements between the optical navigation systems and navigation surfaces to perform tracking operations. An optical navigation system uses a light source to generate illumination light on a navigation surface and an image sensor to successively capture frames of image data of the navigation surface using reflected illumination light. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data.

Optical navigation systems are commonly used in optical computer mice to track the movements of the mice relative to the navigation surfaces on which the mice are manually manipulated. Optical navigation systems are also used in optical finger navigation devices. In an optical finger navigation device, the surface of a finger is used as the navigation surface to track the relative movements of the finger relative to the optical finger navigation device.

A conventional optical finger navigation device includes a light source and a sensor chip with an image sensor array, which are mounted on a printed circuit board. The optical finger navigation device may include an optical element to optically manipulate light from the light source, which is reflected from the finger, onto the image sensor array of the sensor chip. However, the optical element may not be cost effective, which increases the overall cost of the optical finger navigation device.

Thus, there is a need for a lower cost optical element, which can be used in an optical finger navigation device to optically manipulate light reflected from a finger onto an image sensor array of the device.

SUMMARY OF THE INVENTION

An optical finger navigation device and method for making the device uses a light pipe array lens, which includes an array of light pipes formed in a monolithic block of material. The light pipe array lens is configured to function similarly to a fiber bundle lens. However, instead of optical fibers, the light pipe array lens uses the array of light pipes formed in the monolithic block of material to transmit light through the lens. The light pipe array lens provides an economic substitute for a fiber bundle lens in the optical finger navigation device.

A light pipe array lens in accordance with an embodiment of the invention comprises a monolithic block having first and second surfaces, and a two-dimensional array of light pipes disposed in the monolithic block such that the light pipes extend from the first surface to the second surface. The light pipes are made of a first material. Each of the light pipes is enclosed by a second material having an index of refraction lower than an index of refraction of the first material.

An optical finger navigation device in accordance with an embodiment of the invention comprises a light source configured to emit light, a light pipe array lens positioned to receive the light reflected from a navigation surface, and an image sensor array positioned to receive the light from the light pipe array lens to capture image frames of the navigation surface. The image frames provides displacement information of the navigation surface relative to the optical finger navigation device. The light pipe array lens comprises a monolithic block having first and second surfaces, and a two-dimensional array of light pipes disposed in the monolithic block such that the light pipes extend from the first surface to the second surface. The light pipes are made of a first material. Each of the light pipes is enclosed by a second material having an index of refraction lower than an index of refraction of the first material.

A method of making an optical finger navigation device in accordance with an embodiment of the invention comprises fabricating a light pipe array lens that includes an array of light pipes in a monolithic block of material, the light pipes being made of a first material, each of the light pipes being enclosed by a second material having an index of refraction lower than an index of refraction of the first material, attaching the light pipe array lens to a navigation sensor having an image sensor array, mounting the navigation sensor with the light pipe array lens onto a substrate, and mounting a light source onto the substrate.

Other aspects and advantages of the present invention will become apparent from the following detailed description, taken in conjunction with the accompanying drawings, illustrated by way of example of the principles of the invention.

DETAILED DESCRIPTION

Figure 1:
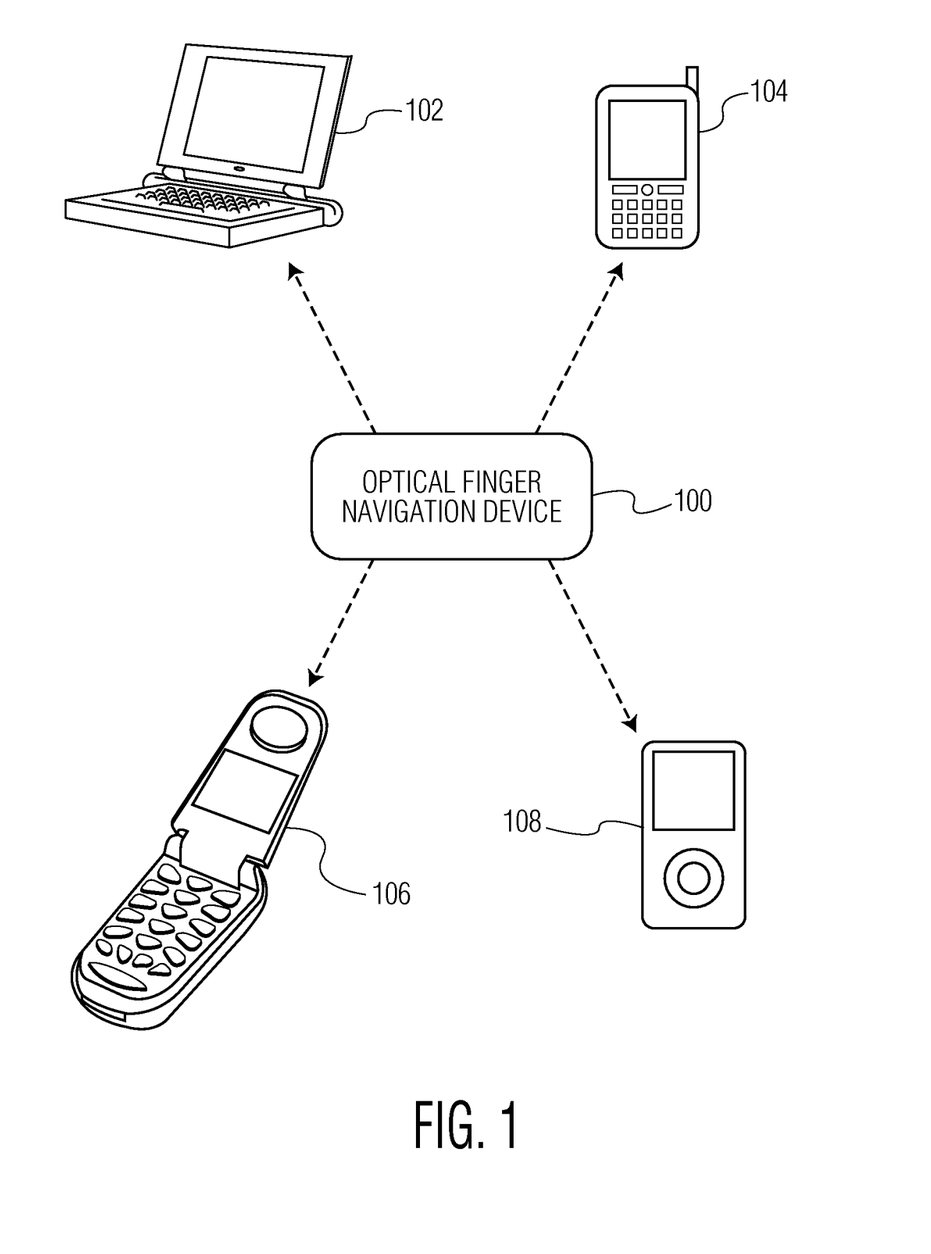
FIG. 1 shows an optical finger navigation device in accordance with an embodiment of the invention, which may be used in various electronic devices.

With reference to FIG. 1, an optical finger navigation device 100 in accordance with an embodiment of the invention is described. The optical finger navigation device 100 allows a user to use a finger to navigate within an electronic environment. As an example, the optical finger navigation device 100 may be used to control a cursor displayed on an electronic screen or to move between different interactive graphic elements displayed on the electronic screen. The optical finger navigation device may be used as a control device in various electronic devices, such as a notebook computer 102, a personal digital assistant (PDA) 104, a cellular phone 106 and a portable media player 108, as illustrated in FIG. 1.

Figure 2:
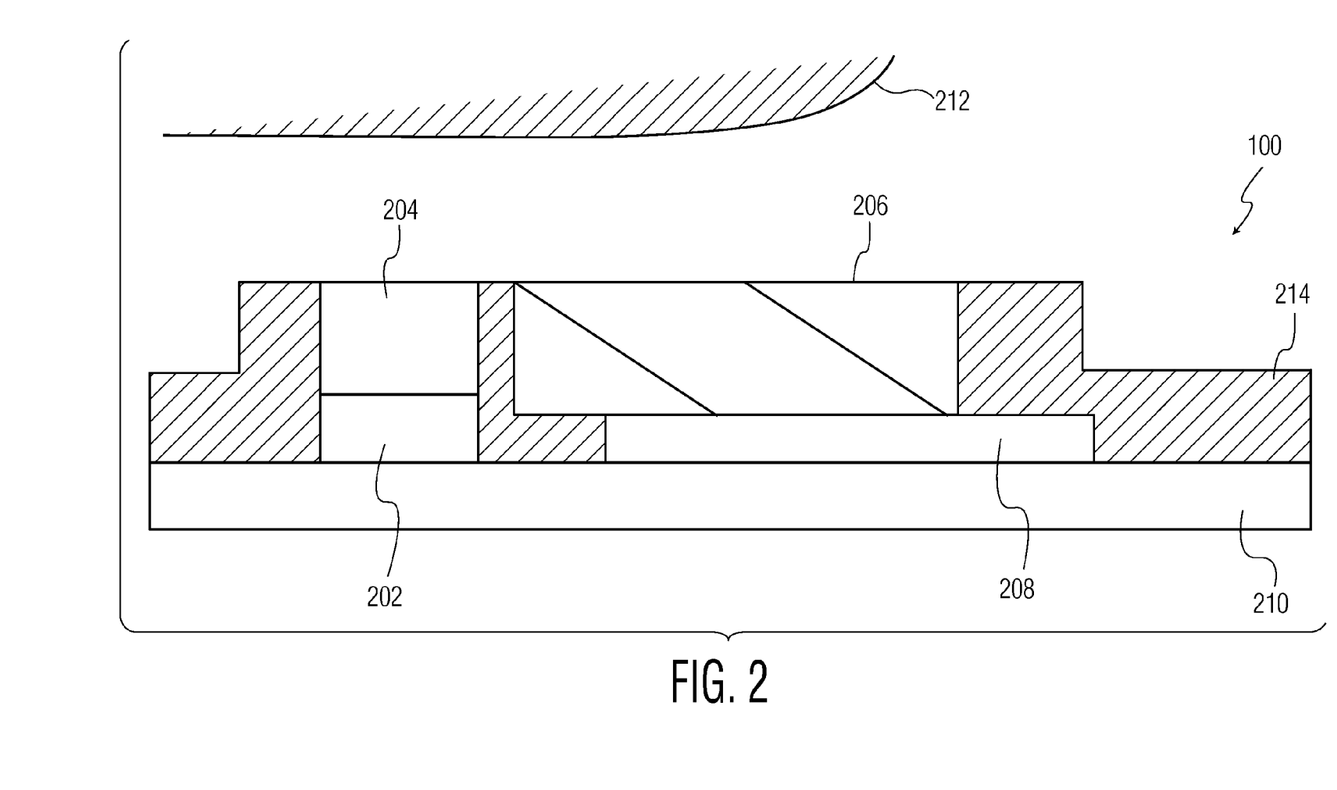
FIG. 2 is a block diagram of the optical finger navigation device of FIG. 1.

Turning now to FIG. 2, components of the optical finger navigation device 100 in accordance with an embodiment of the invention are illustrated. As shown in FIG. 2, the optical finger navigation device 100 includes a light source 202, an optional illumination lens 204, a light pipe array lens 206, a navigation sensor 208 and a printed circuit board (PCB) 210. The light source 202 is mounted on the PCB 210 to emit illumination light toward a target navigation surface 212, which is typically a surface of a finger of a user. The light source 202 may be a light emitting diode, a laser diode or any other light emitting device that can emit any type of light, such as visible or infrared (IR) light. As an example, the light source 202 may be a vertical emitting IR LED. The illumination lens 204 is positioned over the light source 202 such that the light source is positioned between the illumination lens and the PCB 210. The illumination lens 204 is configured to optically manipulate the illumination light from the light source 204 onto the target navigation surface 212. The illumination lens 204 may be configured to focus and/or collimate the illumination light from the light source 202.

The navigation sensor 208 of the optical finger navigation device 100 is also mounted on the PCB 210. The navigation sensor 208 is configured to receive the illumination light reflected from the target navigation surface 212 to electronically capture frames of image data of the target navigation surface. The navigation sensor 208 is further configured to process the captured frames of image data to determine any displacement of the target navigation surface 212 with respect to the optical finger navigation device 100. The navigation sensor 208 is further described below. The light pipe array lens 206 is positioned over the navigation sensor 208 to transmit the illumination light reflected from the target navigation surface 212. The light pipe array lens 206 functions as a fiber bundle lens. However, the light pipe array lens 206 is more cost effective when compared to a compatible fiber bundle lens. The light pipe array lens 206 is described in more detail below.

As shown in FIG. 2, the light source 202, the illumination lens 204, the light pipe array lens 206 and the navigation sensor 208 are positioned in a housing 214, which is attached to the PCB 210. The housing 210 provides structural support and protection for the components of the optical finger navigation device 100. The housing 210 may be made of a plastic material.

Figure 3:
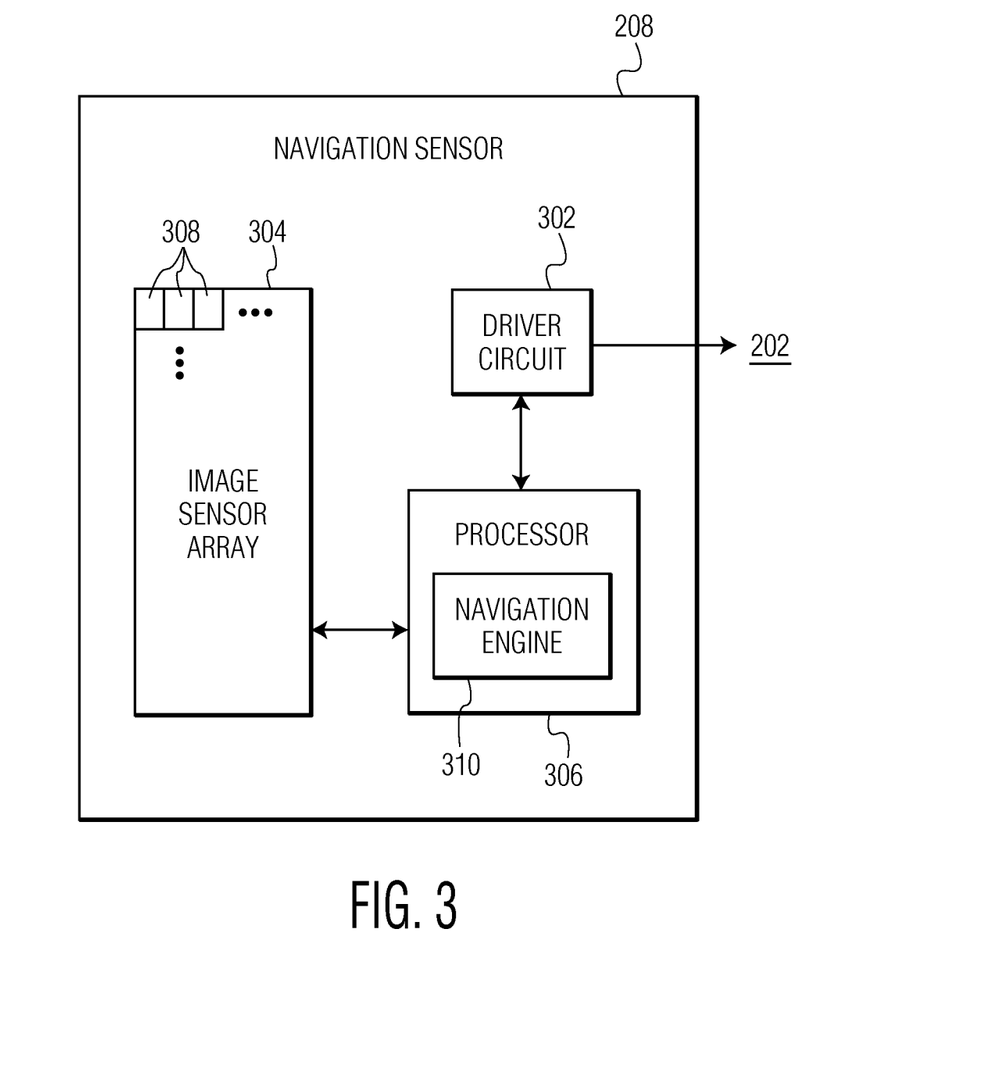
FIG. 3 is a block diagram of a navigation sensor of the optical finger navigation device in accordance with an embodiment of the invention.

In an embodiment, as illustrated in FIG. 3, the navigation sensor 208 may be an integrated circuit chip, which includes a driver circuit 302, an image sensor array 304 and a processor 306. The navigation sensor 208 may also include supporting circuitry (not shown) for the image sensor array 304, such as an analog-to-digital converter and row and column decoders. The navigation sensor 304 may also include other elements commonly found in a conventional navigation sensor for use in an optical computer mouse.

The driver circuit 302 of the navigation sensor 208 is configured to generate driving signals for the light source 202. The driving signals from the driver circuit 302 are transmitted to the light source 202 via the PCB 210 to activate the light source to generate light, which is used to illuminate the target navigation surface 212.

The image sensor array 304 of the navigation sensor 208 is an array of photosensitive pixel elements 308 that generate signals in response to light incident on the elements, where each signal represents the amount or intensity of light incident on a particular element of the image sensor array. These signals are referred to herein as image data. Thus, the image sensor array 304 is able to sequentially capture frames of image data in response to incident light, i.e., the illumination light reflected from the target navigation surface 212 and received by the image sensor array. These frames of image data are used for image correlation to estimate any displacement of the target navigation surface 212 with respect to the optical finger navigation device 100. As an example, the image sensor array 304 may be a charge-coupled device (CCD) imaging array or a complementary metal oxide semiconductor (CMOS) imaging array. The number of photosensitive pixel elements 308 included in the image sensor array 304 may vary. As an example, the image sensor array 304 may be a 21×21 array of photosensitive pixel elements, which may include a frame of dummy pixels.

The processor 306 of the navigation sensor 208 is configured to control various components of the navigation sensor, including the driver circuit 302 and the image sensor array 304, in order to provide illumination light on the target navigation surface 212 and to electronically capture frames of image data in response to the illumination light reflected from the target navigation surface. The processor 306 is electrically connected to the driver circuit 302 to provide control signals to the driver circuit to direct the driver circuit to apply driving signals to the light source 202 to activate the light source. The processor 306 is also electrically connected to the image sensor array 304 via supporting circuitry (not shown) to provide control signals to control the accumulation of electrical signals or charges at the photosensitive pixel elements 308 of the image sensor array to produce each frame of image data for correlation. Thus, the processor 306 is able to control the frame rate of the image sensor array 304.

The processor 306 may be a general-purpose digital processor such as a microprocessor or microcontroller. In other embodiments, the processor 306 may be a special-purpose processor such as a digital signal processor. In other embodiments, the processor 306 may be another type of controller or a field programmable gate array (FPGA).

In an embodiment, the processor 306 includes a navigation engine 310, which is programmed into the processor. However, in other embodiments, the navigation engine 310 may be a separate component. The navigation engine 310 can be implemented in any combination of software, hardware and/or firmware. The navigation engine 310 operates to correlate the frames of image data captured by the image sensor array 304 to estimate any lateral displacement changes of the target navigation surface 212 with respect to X and Y directions, which are parallel to the upper surface of the navigation sensor. The process of correlating frames of image data for motion estimation or navigation is well known, and thus, is not described herein. In an embodiment, the output of the navigation engine 310 includes directional delta x displacement values and directional delta y displacement values. Each directional displacement value includes negative or positive sign information, which indicates direction, and an absolute displacement value, which indicates the amount of displacement in that direction. Thus, the x displacement value indicates displacement change along the X axis, while the y displacement value indicates displacement change along the Y axis. In a particular implementation, the directional delta x and y displacement values are generated in the form of hex numbers.

Although the driver circuit 302, the image sensor array 304 and the processor 306 are integrated into the navigation sensor 208 in the illustrated embodiment, some or all of these components may be physically separate devices in other embodiments.

Figure 4A:
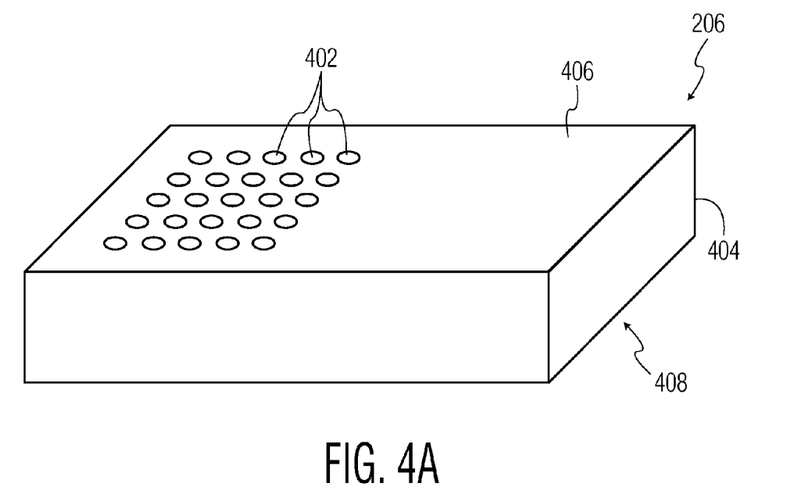
FIGS. 4A-4C are different views of a light pipe array lens of the optical finger navigation device in accordance with an embodiment of the invention.
Figure 4B:
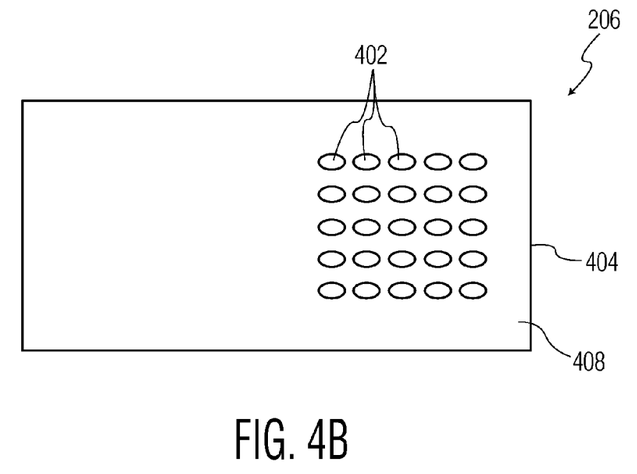
Figure 4C:
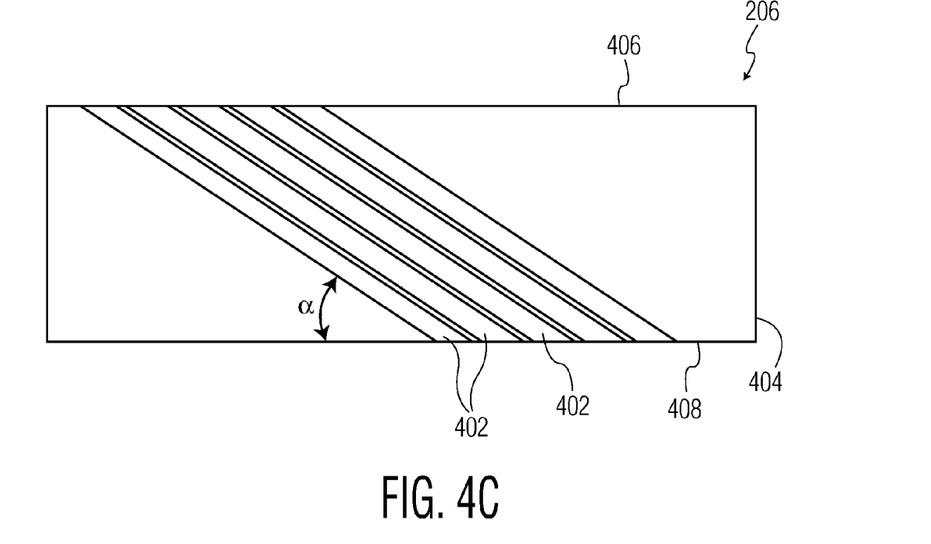

The light pipe array lens 206 of the optical finger navigation device 100 in accordance with an embodiment of the invention is now described in more detail with reference to FIGS. 4A-4C. As mentioned above, the light pipe array lens 206 functions as a fiber bundle lens to direct light reflected from the target navigation surface 212 to the image sensor array 304 of the navigation sensor 208. However, instead of optical fibers, the light pipe array lens 206 uses an array of light pipes 402 that are formed in a monolithic block of material 404, as illustrated in FIG. 4A-4C. FIG. 4A is a perspective view of the light pipe array lens 206, which shows the ends of the light pipes at an upper surface 406 of the block 404. The upper surface 406 of the block 404 is the surface that faces the target navigation surface 212 to receive light reflected from the target navigation surface. Thus, the upper surface 406 of the block 404 is the surface that faces away from the image sensor array 304 of the navigation sensor 208. FIG. 4B is a bottom view of the light pipe array lens 206, which shows the other ends of the light pipes 402 at a lower surface 408 of the block 406. The lower surface 408 of the block 404 is the surface that faces the image sensor array 304 of the navigation sensor 208 to transmit the light reflected from the target navigation surface 212 to the image sensor array to capture frames of image data of the target navigation surface 212 for displacement estimation.

The number of light pipes 402 formed in the block 404 can vary depending on the application of the light pipe array lens. In an optical finger navigation application, the number of light pipes 402 may coincide with the number of photosensitive elements 308 in the image sensor array 304. Thus, for each photosensitive element 308 of the image sensor array 304, there is a corresponding light pipe 402 formed in the light pipe array lens 206. As an example, if the image sensor array is a 21×21, the light pipe array lens 206 may include a 21×21 array of light pipes 402. Furthermore, in an optical finger navigation application, the size of the individual light pipes 402 of the light pipe array lens 206 may be selected to correspond to the size of the individual photosensitive elements 308 of the image sensor array 304. As an example, if the size (i.e., the surface area) of the individual photosensitive elements 308 of the image sensor array 304 is 50 μm by 50 μm, the size (i.e., the end surface area) of each individual light pipe 402 of the light pipe array lens 206 is selected to occupy most of the surface area of a single photosensitive element 308.

In the illustrated embodiment, the light pipes 402 are formed in the block 404 such that the light pipes traverse the block at an angle α of approximately forty-five (45) degrees (+/−5 degrees), as shown in FIG. 4C, which is a cross-sectional side view of the light pipe array lens 206. This angle α is measured from the bottom surface 408 of the block 404, as illustrated in FIG. 4C. However, in other embodiments, the light pipes 402 may traverse the block at a different angle, e.g., at an angle of sixty (60) degrees (+/−5 degrees). The angle α of the light pipes 402 has significance in that this angle is what generates the desired contrast between the ridges and the valleys of the fingerprint (i.e., the target navigation surface 212). The reflections off a finger ridge will couple well into the angled light pipes. However, since the valleys are offset above the light pipes 402, the reflections off the valleys do not couple well into the light pipes. So to the image sensor array 304, the ridges will appear brighter (since more light coupled in) and the valleys darker (since less light coupled in), which creates contrast. The exact angle desired is a function of the difference in refractive indices of the light pipes 402 and the surrounding material.

In some embodiments, the light pipes 402 of the light pipe array lens 206 may be configured such that the cross-sections of the individual light pipes are circular. However, if the light pipes 402 are situated in the block 404 at an angle other than ninety (90) degrees, the shape of the light pipes at the upper and lower surfaces 406 and 408 (i.e., the exposed ends of the light pipes) may be elliptical due to the angle of the light pipes with respect to the upper and lower surfaces, as illustrated in FIGS. 4A and 4B. However, in other embodiments, the light pipes 402 of the light pipe array lens 206 may be configured such that the cross-sections of the individual light pipes are square, rectangular or other geometrical shape. In these embodiments, if the light pipes 402 are situated in the block 404 at an angle other than ninety (90) degrees, the shape of the light pipes at the upper and lower surfaces 406 and 408 may be elongated with respect to the cross-sectional shape of the light pipes due to the angle of the light pipes in the block.

Figure 4D:
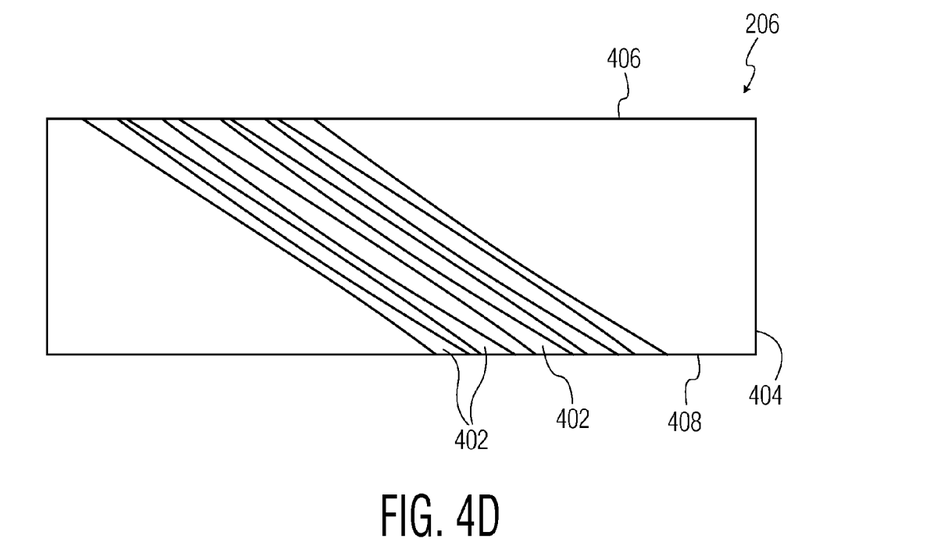
FIG. 4D is a cross-sectional side view of the light pipe array lens in accordance with another embodiment of the invention.

In the illustrated embodiment, the thickness of the light pipes 402 of the light pipe array lens 206 is uniform along the entire lengths of the light pipes. Thus, in this embodiment, the cross-sectional area of the individual light pipes 402 remains constant along their entire lengths. However, in other embodiments, the thickness of the light pipes 402 may not be uniform along the entire lengths of the light pipes. As an example, the light pipes 402 may be thicker near one or both of the upper and lower surfaces 406 and 408 of the block 404, as illustrated in FIG. 4D. As another example, the light pipes 420 may be narrower at the upper surface 406, i.e., at the point of light entry into the monolithic block 404, and wider at the lower surface 408, i.e., at the point of light exit out of the monolithic block. Thus, in these embodiments, the cross-sectional area of the individual light pipes 402 changes along the lengths of the light pipes.

In order for the light pipes 402 of the light pipe array lens 206 to function similarly to optical fibers of a fiber bundle lens, the materials for the block 404 and the light pipes 402 are selected so that each of the light pipes is able to efficiently transmit light down the length of the light pipe. Thus, one of the properties used to select the materials for the block 404 and the light pipes 402 is index of refraction to cause proper internal reflection within the light pipes. The index of refraction of the material for the block 404 should be lower than the index of refraction of the material for the light pipes 402. In an embodiment, the material of the block 404 is optical epoxy. As an example, the material of the block 404 may be optical epoxy from AP Master Bond, e.g., optical epoxy sold under the names of EP 112 (index of refraction=1.5 at 589 nm). In an embodiment, the material of the light pipes 402 is polymer with nanoparticles. As an example, the material of the light pipes 402 may be high transparency, high refractive index polymer nanocomposites from NanoGram Corporation or a polymer material from Nitto Denko Corporation. In another embodiment, the material of the light pipes 402 is optical epoxy. As an example, the material of the light pipes 402 may be optical epoxy from AP Master Bond, e.g., optical epoxy sold under the name of EP 30-3 (index of refraction=1.6 at 589 nm). As another example, the material of the light pipes 402 may be optical epoxy from Epoxy Technology, e.g., optical epoxy sold under the name of 353ND.

Another desired property of the materials used for the block 404 and the light pipes 402 of the light pipe array lens 206 is the ability to withstand high temperatures since these materials must withstand lead-free solder reflow once cured so that the light pipe array lens can be attached to the navigation sensor 208 prior to the navigation sensor being mounted onto the PCB 210 using lead-free solder reflow. Since the light pipe array lens 206 may be subjected to a range of temperature during the lead-free solder reflow, it is important that the materials used for the block 404 and the light pipes 402 of the light pipe array lens 206 can withstand at least the peak temperature during lead-free solder reflow, which can be approximately 260 degrees Centigrade. The above examples of the materials for the block 404 and the light pipes 402 of the light pipe array lens 206 are able to withstand temperatures involved during lead-free solder reflow.

Figure 5:
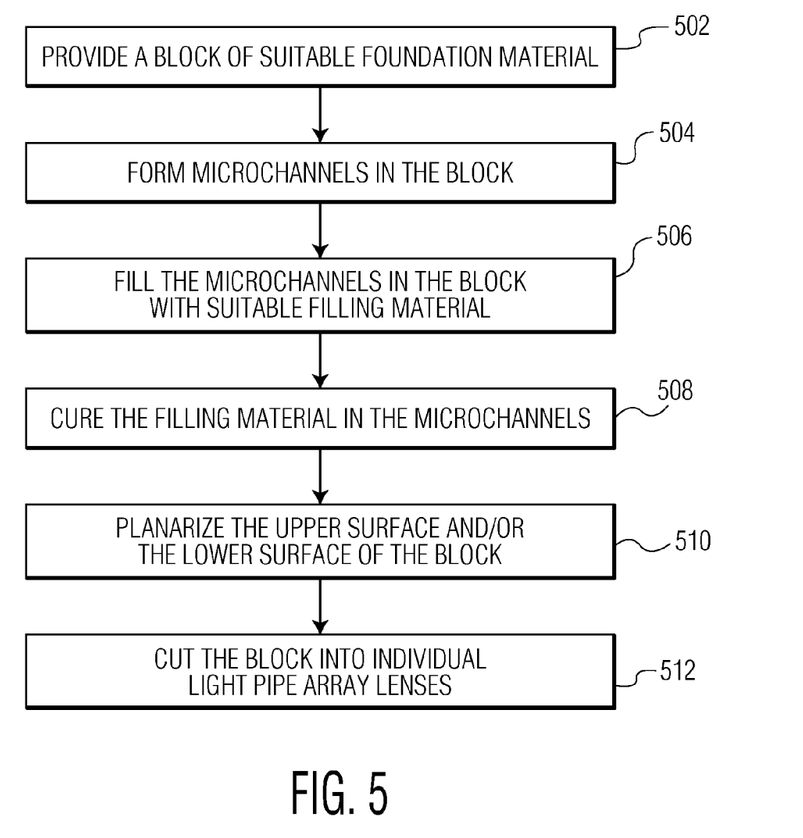
FIG. 5 is a flow diagram of a process of fabricating the light pipe array lens of FIGS. 4A-4C in accordance with an embodiment of the invention.

A process of fabricating the light pipe array lens 206 in accordance with an embodiment of the invention is described with reference to a flow diagram of FIG. 5. At step 502, a block of suitable foundation material is provided. As an example, the suitable foundation material for the block may be optical epoxy. In an embodiment, the block of material is configured as a rectangular solid with an upper surface and a lower surface, which are located on opposite sides of the block of material. In an embodiment, the size of the block of material is selected to produce multiple light pipe array lenses from the block. Next, at step 504, microholes or microchannels are formed in the block of material such that the microchannels traverse from the upper surface to the lower surface of the block. The cross-sections of the microchannels may be circular, square or rectangular. In an embodiment, the microchannels are formed in the block of material using laser microdrilling. Next, at step 506, the microchannels in the block of material are filled with suitable filling material, e.g., polymer with nanoparticles, to form the light pipes in the block of material. In an embodiment, the filling of the microchannels may involve applying a vacuum on the microchannels from one side of the block to draw the filling material through the microchannels from the other side of the block. In an embodiment, the temperature of the filling material may be raised from room temperature to make the filling material more easily to flow through the microchannels.

Next, at step 508, the filling material in the microchannels is cured to set the filling material to form the light pipes in the block. Next, at optional step 510, one or both of the upper and lower surfaces of the block are planarized to smooth out these surfaces. Next, at step 512, the block is cut into individual light pipe array lenses. As an example, the block may be cut using a known laser singulation technique. In an embodiment, the resulting light pipe array lenses are aligned and attached to navigation sensors, e.g., the navigation sensor 208, which are then packaged into optical finger navigation devices, e.g., the optical finger navigation device 100.

Figure 6A:
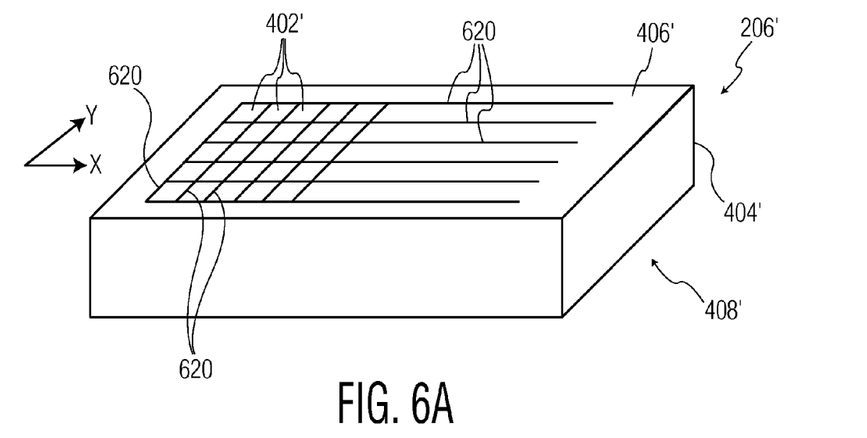
FIGS. 6A-6C are different views of a light pipe array lens of the optical finger navigation device in accordance with another embodiment of the invention.
Figure 6B:
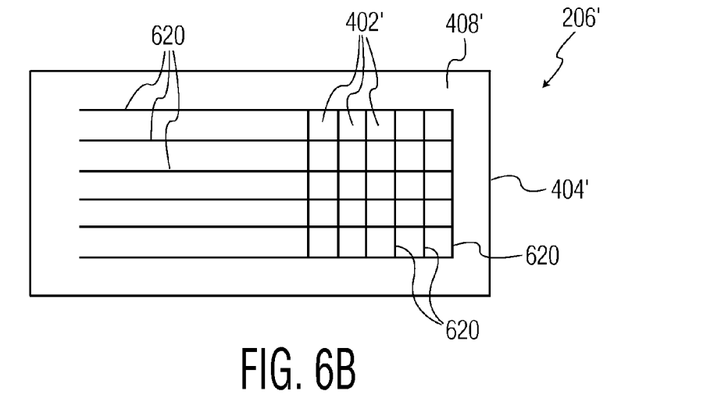
Figure 6C:
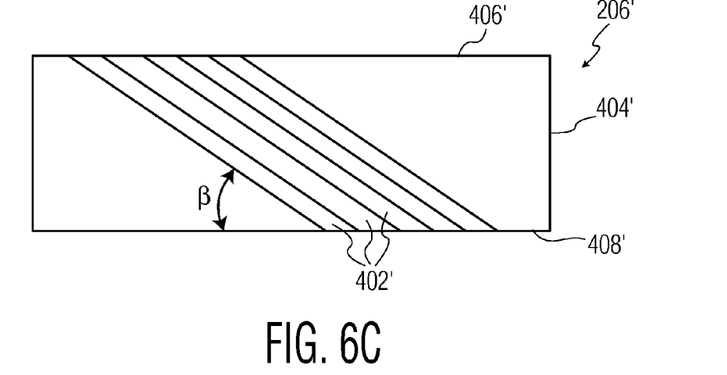

Turning now to FIGS. 6A-6C, a light pipe array lens 206' in accordance with an alternative embodiment of the invention is shown. Similar to the light pipe array 206 of FIGS. 4A-4D, the light pipe array lens 206' includes an array of light pipes 402' formed in a monolithic block 404', which may be made of the same material as the light pipes 402 in the light pipe array lens 206. The light pipes 402' are also made of the same material as the block 404' in which the light pipes 402' are formed. Thus, in this embodiment, the light pipes 402' and the block 404' are made of the same material. In order to cause proper internal reflection within the light pipes 402', each of the light pipes 402' is surrounded by suitable filling material 620 having a lower index of refraction than the index of refraction of the light pipe. The suitable filling material 620 may be the same material as the block 404 of the light pipe array lens 206. The suitable filling material 620 forms walls around the light pipes 402' to surround each light pipe with a lower index of refraction material to cause internal reflection within the light pipes. The walls formed from the filling material 620 along the Y axis will be referred to herein as vertical walls, while the walls formed from the filling material 620 along the X axis will be referred to herein as horizontal walls.

FIG. 6A is a perspective view of the light pipe array lens 206', which shows the ends of the light pipes at an upper surface 406' of the block 404'. The upper surface 406' of the block 404' is the surface that faces the target navigation surface 212 to receive light reflected from the target navigation surface. FIG. 6B is a bottom view of the light pipe array lens 206', which shows the other ends of the light pipes 402' at a lower surface 408' of the block 404'. The lower surface 408' of the block 404' is the surface that faces the image sensor array 304 of the navigation sensor 208 to transmit light reflected from the target navigation surface 212 to the image sensor array to capture frames of image data of the target navigation surface for displacement estimation.

The number of light pipes 402' formed in the block 404' can vary depending on the application of the light pipe array lens 206'. In an optical finger navigation application, the number of light pipes 402' may coincide with the number of photosensitive elements 308 in the image sensor array 304. Thus, for each photosensitive element 308 in the image sensor array 304, there is a corresponding light pipe 402' formed in the light pipe array lens 206'. As an example, if the image sensor array 304 is a 21×21, the light pipe array lens 206' may include a 21×21 array of light pipes 402'. Furthermore, in an optical finger navigation application, the size of the individual light pipes 402' of the light pipe array lens 206' is selected to correspond to the size of the individual photosensitive elements 308 of the image sensor array 304. As an example, if the size (i.e., the surface area) of the individual photosensitive elements 308 of the image sensor array 304 is 50 µm by 50 µm, the size (i.e., the end surface area) of each individual light pipe 402' of the light pipe array lens 206' is selected to occupy most of the surface area of a single photosensitive element 308.

In the illustrated embodiment, the light pipes 402' are formed in the block 404' such that the light pipes 402' traverse the block 404' at an angle β of approximately 45 degrees (+/−5 degrees), as shown in FIG. 6C, which is a cross-sectional side view of the light pipe array lens 206'. This angle β is measured from the bottom surface 408' of the block 404', as illustrated in FIG. 6C. However, in other embodiments, the light pipes 402' may traverse the block 404' at a different angle.

In the illustrated embodiment, the light pipes 402' of the light pipe array lens 206' are configured such that the cross-sections of the individual light pipes are square or rectangular. If the light pipes 402' are situated in the block 404' at an angle other than ninety (90) degrees, the shape of the light pipes 402' at the upper and lower surfaces 406' and 408' will be elongated with respect to the cross-sectional shape of the light pipes 402' due to the angle of the light pipes 402' in the block 404'.

Figure 7:
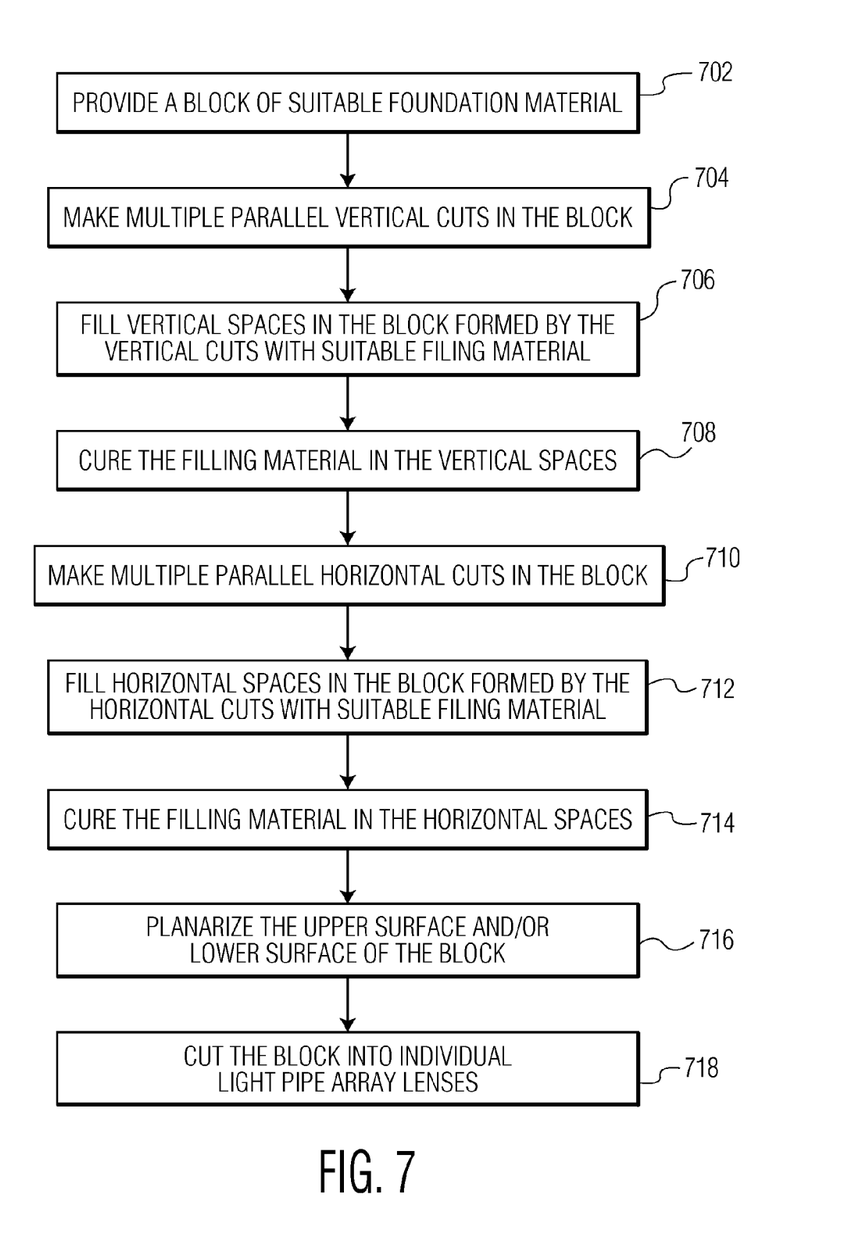
FIG. 7 is a flow diagram of a process of fabricating the light pipe array lens of FIGS. 6A-6C in accordance with an embodiment of the invention.

A process of fabricating the light pipe array lens 206' in accordance with an embodiment of the invention is described with reference to a flow diagram of FIG. 7. At step 702, a block of suitable foundation material is provided. The suitable foundation material for the block may be optical epoxy or polymer with nanoparticles, which is optically transparent. In an embodiment, the block of material is configured as a rectangular solid with an upper surface and a lower surface, which are located on opposite sides of the block of material. The size of the block of material is selected to produce a number of light pipe array lenses. Next, at step 704, multiple parallel vertical cuts (along the Y axis) are made in the block of material to form vertical walls. As an example, the vertical cuts may be made in the block of material using a laser. Next, at step 706, vertical spaces in the block of material formed by the vertical cuts are filled with suitable filling material, such as optical epoxy with a lower index of refraction than the block of foundation material. Next, at step 708, the filling material in the vertical spaces is cured to form the vertical walls. Next, at step 710, multiple parallel horizontal cuts (along the X axis) are made in the block of material to form horizontal walls. As an example, the horizontal cuts may also be made in the block of material using a laser. Next, at step 712, horizontal spaces in the block of material formed by the horizontal cuts are filled with suitable filling material, which may be same as the filling material for the spaces formed by the vertical cuts. Next, at step 714, the filling material in the horizontal spaces is cured to form the horizontal walls. As a result, light pipes are defined in the block by the vertical and horizontal walls. In an alternative embodiment, the horizontal walls may be formed before the vertical walls.

Next, at optional step 716, one or both of the upper and lower surfaces of the block are planarized to smooth out these surfaces. Next, at step 718, the block is cut into individual light pipe array lenses. As an example, the block may be cut using a known laser singulation technique. In an embodiment, the resulting light pipe array lenses are aligned and attached to navigation sensors, e.g., the navigation sensor 208, which are then packaged into optical finger navigation devices, e.g., the optical finger navigation device 100.

Figure 8:
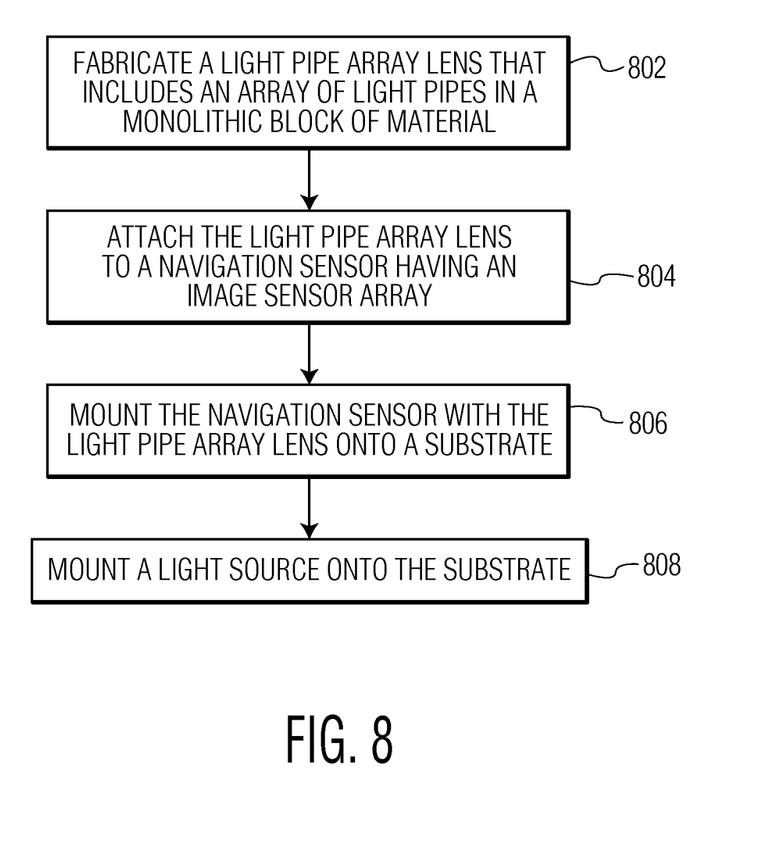
FIG. 8 is a process flow diagram of a method of making an optical finger navigation device in accordance with an embodiment of the invention.

A method for making an optical finger navigation device in accordance with an embodiment of the invention is described with reference to a process flow diagram of FIG. 8. At step 802, a light pipe array lens that includes an array of light pipes in a monolithic block of material is fabricated. The light pipes are made of a first material. Each of the light pipes is enclosed by a second material having an index of refraction lower than an index of refraction of the first material. Next, at step 804, the light pipe array lens is attached to a navigation sensor having an image sensor array. Next, at step 806, the navigation sensor with the light pipe array lens is mounted onto a substrate. Next, at block 808, a light source is mounted onto the substrate. The light source is used to emit an illumination light onto a target navigation surface, which is reflected off the target navigation surface and directed to the image sensor array of the navigation sensor via the light pipe array lens.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A light pipe array lens comprising:
   a monolithic block having first and second surfaces, the monolithic block being made of a first material, the monolithic block including a plurality of parallel cuts within the monolithic block that extend from the first surface of the monolithic block to the second surface of the monolithic block; and
   a two-dimensional array of light pipes disposed in the monolithic block such that the light pipes extend from the first surface to the second surface, the light pipes being made of the same first material as the monolithic block, each of the light pipes being enclosed by walls made of a second material having an index of refraction lower than an index of refraction of the first material, wherein the walls are disposed in the plurality of the parallel cuts of the monolithic block and wherein the walls are formed in the parallel cuts of the monolithic block with the second material to define the light pipes that are enclosed by the walls.

2. The light pipe array lens of claim 1, wherein the first material includes polymer with nanoparticles.

3. The light pipe array lens of claim 1, wherein the second material includes optical epoxy.

4. The light pipe array lens of claim 1, wherein the light pipes are disposed at an angle of approximately forty-five degrees from the bottom surface of the monolithic block.

5. An optical finger navigation device comprising:
   a light source configured to emit light;
   a light pipe array lens positioned to receive the light reflected from a navigation surface, the light pipe array lens comprising:
      a monolithic block having first and second surfaces, the monolithic block being made of a first material, the monolithic block including a plurality of parallel cuts within the monolithic block that extend from the first surface of the monolithic block to the second surface of the monolithic block; and
      a two-dimensional array of light pipes disposed in the monolithic block such that the light pipes extend from the first surface to the second surface, the light pipes being made of the same first material as the monolithic block, each of the light pipes being enclosed by walls made of a second material having an index of refraction lower than an index of refraction of the first material, wherein the walls are disposed in the plurality of the parallel cuts of the monolithic block and wherein the walls are formed in the parallel cuts of the monolithic block with the second material to define the light pipes that are enclosed by the walls; and
   an image sensor array positioned to receive the light from the light pipe array lens to capture image frames of the navigation surface, the image frames providing displacement information of the navigation surface relative to the optical navigation system.

6. The optical finger navigation device of claim 5, wherein the first material includes polymer with nanoparticles.

7. The optical finger navigation device of claim 5, wherein the second material includes optical epoxy.

8. The optical finger navigation device of claim 5, wherein the light pipes of the light pipe array lens are disposed at an angle of approximately forty-five degrees from the bottom surface of the monolithic block.

9. The optical finger navigation device of claim 5, wherein the image sensor array is part of a navigation sensor, the navigation sensor including a navigation engine configured to estimate relative displacement of the navigation surface using the image frames of the navigation surface from the image sensor array.

10. The optical finger navigation device of claim 9, further comprising a printed circuit board, the light source and the navigation sensor being mounted on the printed circuit board.

11. A method of making an optical finger navigation device, the method comprising:
    fabricating a light pipe array lens that includes an array of light pipes in a monolithic block of material having first and second surfaces, the monolithic block including at least one of a plurality of microchannels that extend from the first surface to the second surface and a plurality of parallel cuts that extend from the first surface to the second surface, the light pipes being made of a first material, each of the light pipes being enclosed by walls made of a second material having an index of refraction lower than an index of refraction of the first material, wherein at least some of the light pipes and the walls are disposed in one of the plurality of microchannels and the plurality of the parallel cuts;

attaching the light pipe array lens to a navigation sensor having an image sensor array;

mounting the navigation sensor with the light pipe array lens onto a substrate; and mounting a light source onto the substrate.

12. The method of claim 11, wherein the monolithic block of the light pipe array lens is made of the second material.

13. The method of claim 12, wherein the fabricating the light pipe array lens includes forming the microchannels in the monolithic block and filling the microchannels with the first material.

14. The method of claim 11, wherein the fabricating the light pipe array includes forming the walls in the monolithic block such that each of the light pipes is defined and enclosed by the walls.

15. The method of claim 14, wherein the forming the walls includes making vertical and horizontal cuts in the monolithic block and filling vertical and horizontal spaces formed by the vertical and horizontal cuts with the second material.

16. The method of claim 11, wherein the fabricating the light pipe array lens includes forming the light pipes in the monolithic block at an angle of approximately forty-five degrees from the bottom surface of the monolithic block.

17. The light pipe array lens of claim 1, wherein the walls of the monolithic block includes first parallel walls along a first direction and second parallel walls along a second direction that is orthogonal to the first direction.

18. The optical finger navigation device of claim 5, wherein the walls of the monolithic block includes first parallel walls along a first direction and second parallel walls along a second direction that is orthogonal to the first direction.

* * * * *